(12) United States Patent
Feng et al.

(10) Patent No.: US 12,508,526 B2
(45) Date of Patent: Dec. 30, 2025

(54) GAS-LIQUID SEPARATOR (71) Applicants: York (Wuxi) Air Conditioning and Refrigeration Co., Ltd., Wuxi (CN); Johnson Controls Tyco IP Holdings LLP, Milwaukee, WI (US)

(72) Inventors: Zhanhui Feng, Wuxi (CN); Fang Xue, Wuxi (CN); Xiuping Su, Wuxi (CN); Lu Mei, Wuxi (CN)

(73) Assignees: York (Wuxi) Air Conditioning and Refrigeration Co., Ltd., Wuxi (CN); Tyco Fire & Security GmbH, Neuhausen am Rheinfall (CH)

( * ) Notice: Subject to any disclaimer, the term of this patent is extended or adjusted under 35 U.S.C. 154(b) by 427 days.

(21) Appl. No.: 18/007,937

(22) PCT Filed: May 31, 2021

(86) PCT No.: PCT/CN2021/097159
§ 371 (c)(1),
(2) Date: Dec. 2, 2022

(87) PCT Pub. No.: WO2021/244465
PCT Pub. Date: Dec. 19, 2021

(65) Prior Publication Data
US 2023/0249111 A1 Aug. 10, 2023

(30) Foreign Application Priority Data
Jun. 3, 2020 (CN) .......................... 202010494328.9

(51) Int. Cl.
*B01D 45/08* (2006.01)
*B01D 45/02* (2006.01)
(Continued)

(52) U.S. Cl.
CPC ............. *B01D 45/08* (2013.01); *B01D 45/02* (2013.01); *B01D 45/06* (2013.01); *B01D 45/16* (2013.01)

(58) Field of Classification Search
CPC ........ B01D 45/08; B01D 45/02; B01D 45/06; B01D 45/16; B04B 1/06; B04B 7/12
See application file for complete search history.

(56) References Cited

U.S. PATENT DOCUMENTS 432,491 A * 7/1890 Kutsche .................. B04C 5/103
55/426
468,935 A * 2/1892 Morse ..................... B04C 5/103
55/399

(Continued)

FOREIGN PATENT DOCUMENTS

CA 2583076 A1 12/2002
CN 203447899 U 2/2014
(Continued)

OTHER PUBLICATIONS

PCT International Search Report for PCT Application No. PCT/CN2021/097159, mailed Aug. 24, 2021, 3 pages.
(Continued)

*Primary Examiner* — Dung H Bui
(74) *Attorney, Agent, or Firm* — Fletcher Yoder, PC (57) ABSTRACT

This application provides a gas-liquid separator, including a housing assembly and a plurality of first ribs. The housing assembly has an inner side wall defining a housing accommodation cavity. The housing assembly includes an inlet, a gas outlet, and a liquid outlet, the inlet. The gas outlet, and the liquid outlet are communicated with the housing accommodation cavity. The inlet is provided on the inner side wall of the housing accommodation cavity, the gas outlet is provided above the inlet, and the liquid outlet is provided below the inlet. The plurality of first ribs are arranged on the
(Continued)

inner side wall of the housing assembly. Each of the plurality of first ribs is arranged at an angle with respect to a height direction of the housing assembly, and each of the plurality of first ribs includes a first rib windward end and a first rib leeward end. In a flow direction of a fluid entering the housing accommodation cavity from the inlet, the first rib windward end is located upstream of the first rib leeward end. In the height direction of the housing assembly, the first rib windward end is higher than the first rib leeward end. The gas-liquid separator has a compact structure, a small overall volume, and high separation efficiency.

15 Claims, 7 Drawing Sheets

(51) Int. Cl.
*B01D 45/06* (2006.01)
*B01D 45/16* (2006.01)

(56) References Cited

U.S. PATENT DOCUMENTS

| | | | | |
|---|---|---|---|---|
| 814,837 | A * | 3/1906 | Fenton | B01D 46/4272 15/340.1 |
| 1,055,792 | A * | 3/1913 | Plock | B04C 5/103 55/435 |
| 2,010,128 | A * | 8/1935 | Arnold | B04C 5/13 55/459.3 |
| 2,222,930 | A * | 11/1940 | Arnold | B04C 5/00 55/416 |
| 2,351,864 | A * | 6/1944 | Linderman, Jr. | B04C 9/00 261/112.1 |
| 2,378,600 | A * | 6/1945 | Van Tongeren | B04C 5/081 55/459.5 |
| 2,542,635 | A | 2/1951 | Davis et al. | |
| 3,399,770 | A * | 9/1968 | Salomon | B04C 5/103 210/512.1 |
| 3,513,642 | A * | 5/1970 | Cornett | B04C 5/13 209/23 |
| 3,577,711 | A * | 5/1971 | De Bernardo | F01N 3/037 55/448 |
| 3,951,620 | A * | 4/1976 | Frischmuth, Jr. | B01D 45/12 95/271 |
| 3,961,922 | A * | 6/1976 | Leung | B01D 45/08 55/440 |
| 4,229,194 | A * | 10/1980 | Baillie | B01J 8/0055 55/435 |
| 4,251,242 | A * | 2/1981 | Ito | B01D 45/16 55/440 |
| 4,514,202 | A | 4/1985 | Kinney, Jr. et al. | |
| 4,600,410 | A * | 7/1986 | Baillie | B04C 5/103 209/471 |
| 4,784,674 | A * | 11/1988 | Sarmiento | B01D 45/04 55/440 |
| 4,834,887 | A * | 5/1989 | Broughton | B04C 3/06 210/512.1 |
| 5,085,826 | A * | 2/1992 | Oosterkamp | B01D 19/0057 376/377 |
| 5,137,554 | A * | 8/1992 | Carter, Jr. | A47L 9/1608 55/459.1 |
| 5,320,651 | A * | 6/1994 | Drummond | B01J 19/32 55/440 |
| 6,264,712 | B1 * | 7/2001 | Decker | B01D 45/08 55/448 |
| 6,770,121 | B1 * | 8/2004 | Sindel | B01D 45/08 55/440 |
| 6,837,912 | B1 * | 1/2005 | Heumann | B01D 45/16 55/424 |
| 8,034,143 | B2 * | 10/2011 | Tan | B04C 3/06 95/271 |
| 8,273,158 | B2 * | 9/2012 | Jarrier | B01D 46/62 55/482 |
| 8,898,856 | B2 * | 12/2014 | Ruben | A47L 9/1608 55/440 |
| 9,039,799 | B2 * | 5/2015 | Schook | B01D 45/06 55/440 |
| 9,761,416 | B2 * | 9/2017 | Nguyen | H01J 37/32495 |
| 2009/0282858 | A1 * | 11/2009 | Demetri | F25B 9/004 62/401 |
| 2009/0300874 | A1 * | 12/2009 | Tran | A47L 9/1683 15/353 |
| 2009/0320689 | A1 * | 12/2009 | Krell | F28C 1/16 96/299 |
| 2018/0036746 | A1 * | 2/2018 | Antomon | B04C 9/00 |
| 2019/0168147 | A1 * | 6/2019 | Bratton | B01D 45/12 |

FOREIGN PATENT DOCUMENTS

| | | |
|---|---|---|
| CN | 203648273 U | 6/2014 |
| CN | 104548840 A | 4/2015 |
| CN | 104623987 A | 5/2015 |
| CN | 206285624 U | 6/2017 |
| CN | 206315572 U | 7/2017 |
| CN | 206897013 U | 1/2018 |
| CN | 207237488 U | 4/2018 |
| CN | 108993065 A | 12/2018 |
| CN | 208436527 U | 1/2019 |
| CN | 109442588 A | 3/2019 |
| CN | 209558558 U | 10/2019 |
| CN | 209662812 U | 11/2019 |
| CN | 209679678 U | 11/2019 |
| CN | 110870998 A | 3/2020 |
| DE | 324260 C | 8/1920 |
| DE | 414140 C | 5/1925 |
| GB | 1083264 A | 9/1967 |
| WO | 2007012823 A2 | 2/2007 |

OTHER PUBLICATIONS

European Search Report for EP Application No. 21818284.8, dated Mar. 14, 2024, 6 pages.

* cited by examiner

GAS-LIQUID SEPARATOR

CROSS-REFERENCE TO RELATED APPLICATIONS

This application is a U.S. National Stage Application of PCT Application No. PCT/CN2021/097159, entitled "GAS-LIQUID SEPARATOR," filed May 31, 2021, which claims priority from and the benefit of Chinese Patent Application No. 202010494328.9, filed Jun. 3, 2020, each of which is herein incorporated by reference in its entirety for all purposes.

BACKGROUND

Technical Field

This application relates to a gas-liquid separator.

Related Art

A gas-liquid separator generally includes an inlet, a gas outlet, and a liquid outlet. The inlet is located at a side portion, the gas outlet is located at an upper portion, and the liquid outlet is located at a lower portion. The inlet is configured to receive a mixed fluid of gas and liquid. After the mixed fluid enters the gas-liquid separator from the inlet, due to different gravity of the liquid and the gas, the gas moves upwards and flows out of the gas-liquid separator through the gas outlet, while the liquid moves downwards and flows out of the gas-liquid separator through the liquid outlet. The amount of droplets entrained by the gas separated in the separation manner using gravity is relatively large.

SUMMARY

Exemplary embodiments of this application can resolve at least some of the foregoing problems.

This application provides a gas-liquid separator, where the gas-liquid separator includes a housing assembly and a plurality of first ribs. The housing assembly has an inner side wall defining a housing accommodation cavity, the housing assembly includes an inlet, a gas outlet, and a liquid outlet, the inlet, the gas outlet, and the liquid outlet are communicated with the housing accommodation cavity, the inlet is provided on the inner side wall of the housing accommodation cavity, the gas outlet is provided above the inlet, and the liquid outlet is provided below the inlet. The plurality of first ribs are arranged on the inner side wall of the housing assembly. Each of the plurality of first ribs is arranged at an angle with respect to a height direction of the housing assembly, and each of the plurality of first ribs includes a first rib windward end and a first rib leeward end; in a flow direction of a fluid entering the housing accommodation cavity from the inlet, the first rib windward end is located upstream of the first rib leeward end; and in the height direction of the housing assembly, the first rib windward end is higher than the first rib leeward end.

According to the foregoing gas-liquid separator, the housing assembly includes an outer housing and a housing bushing, the housing bushing is arranged in the outer housing, and the inner side wall defining the housing accommodation cavity is formed by the housing bushing.

According to the foregoing gas-liquid separator, the angle between each of the plurality of first ribs and the height direction is greater than 0° and less than or equal to 45°.

According to the foregoing gas-liquid separator, the plurality of first ribs are arranged into a plurality of groups of first ribs; and each group of first ribs is arranged along the height direction of the housing assembly, and the plurality of groups of first ribs are arranged along a circumferential direction of the housing assembly and spaced apart from each other.

According to the foregoing gas-liquid separator, in the flow direction of the fluid entering the housing accommodation cavity from the inlet, for adjacent first ribs, a first rib leeward end of a first rib at a higher height is located downstream of a first rib leeward end of a first rib at a lower height.

According to the foregoing gas-liquid separator, the gas-liquid separator further includes an inner sleeve. The inner sleeve is arranged in the housing accommodation cavity. There is a distance between an outer side wall of the inner sleeve and the inner side wall defining the housing accommodation cavity, to form an annular channel; and the inlet is communicated with the annular channel. The inner sleeve further includes a plurality of second ribs, and the plurality of second ribs are arranged on the outer side wall of the inner sleeve body. Each of the plurality of second ribs is arranged at an angle with respect to the height direction of the housing assembly, and each of the plurality of second ribs includes a second rib windward end and a second rib leeward end; in the flow direction of the fluid entering the housing accommodation cavity from the inlet, the second rib windward end is located upstream of the second rib leeward end; and in the height direction of the housing assembly, the second rib windward end is higher than the second rib leeward end.

According to the foregoing gas-liquid separator, the inner sleeve includes an inner sleeve body, the inner sleeve body defines an inner sleeve accommodation cavity, the inner sleeve accommodation cavity is communicated with the liquid outlet, and a communication port is provided at a lower portion of the inner sleeve body, to enable the annular channel to be communicated with the inner sleeve accommodation cavity through the communication port.

According to the foregoing gas-liquid separator, the inner sleeve further includes an annular baffle, and the annular baffle covers above the annular channel.

According to the foregoing gas-liquid separator, the gas-liquid separator further includes: a first inlet pipe section and a second inlet pipe section, where the first inlet pipe section is connected to the second inlet pipe section, and the first inlet pipe section is communicated with the inlet through the second inlet pipe section; and in the height direction, a size of the second inlet pipe section is larger than a size of the first inlet pipe section.

According to the foregoing gas-liquid separator, the gas-liquid separator further includes an additional gas-liquid separation apparatus, where the additional gas-liquid separation apparatus is transversely arranged in the housing accommodation cavity, and divides the housing accommodation cavity into an upper accommodation cavity and a lower accommodation cavity. A plurality of bent channels are provided in the additional gas-liquid separation apparatus, and the upper accommodation cavity is communicated with the lower accommodation cavity through the plurality of bent channels. The additional gas-liquid separation apparatus further includes a first plate and a second plate that are stacked, the first plate and the second plate are molded, and each of the plurality of bent channels runs through the first plate and the second plate.

According to the foregoing gas-liquid separator, each of the plurality of bent channels includes a first vertical channel and a first inclined channel formed in the first plate and a second vertical channel and a second inclined channel formed in the second plate; and the first inclined channel is communicated with the second inclined channel.

The gas-liquid separator according to this application has a compact structure, a small overall volume, and high separation efficiency.

BRIEF DESCRIPTION OF THE DRAWINGS

The features and advantages of this application can be better understood by reading the following detailed description with reference to the accompanying drawings. In the accompanying drawings, the same reference numerals refer to the same parts, where.

DETAILED DESCRIPTION

Various specific implementations of this application are described below with reference to the accompanying drawings that form a part of this specification. It should be understood that in the following figures, the same reference numerals are used for the same parts.

Various specific implementations of this application are described below with reference to the accompanying drawings that form a part of this specification. It should be understood that although directional terms such as "upper", "lower", "inner", "outer", "top", and "bottom" are used in this application to describe various exemplary structural parts and elements of this application, but such terms are used herein for convenience of description only, and are determined based on the exemplary orientations shown in the drawings. Since the embodiments disclosed in this application may be set in different orientations, such directional terms are used for illustration only and should not be regarded as limiting.

The ordinal numbers such as "first" and "second" used in this application are only used for distinguishing and identifying, and do not have any other meanings. Unless otherwise specified, such ordinal numbers do not represent a specific order or have specific association. For example, the term "first rib" does not imply the existence of a "second rib", nor does the term "second rib" imply the existence of a "first rib".

Figure 1A:
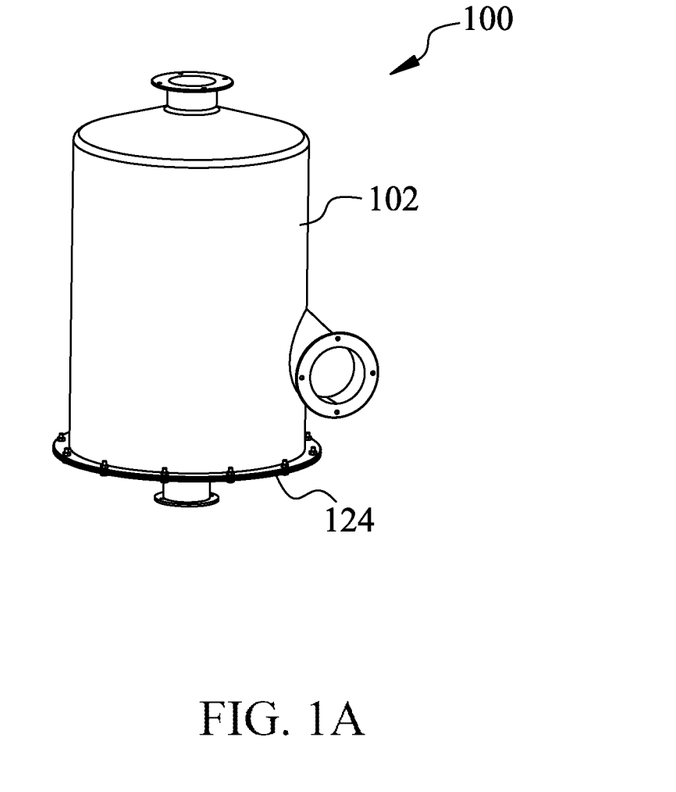
FIG. 1A is a perspective view of a gas-liquid separator according to an embodiment of this application.
Figure 1B:
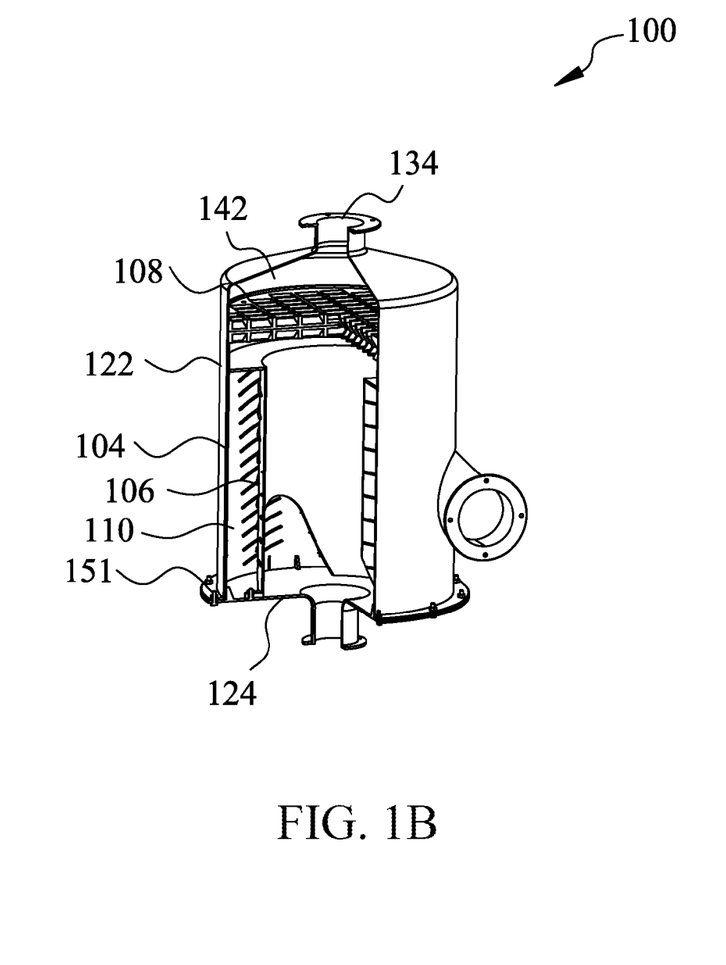
FIG. 1B is a partial cross-sectional view of the gas-liquid separator shown in FIG. 1A.

FIG. 1A is a perspective view of a gas-liquid separator 100 according to an embodiment of this application. FIG. 1B is a partial cross-sectional view of the gas-liquid separator 100 shown in FIG. 1A. As shown in FIG. 1A and FIG. 1B, the gas-liquid separator 100 includes a housing assembly 102, an inner sleeve 106, and an additional gas-liquid separation apparatus 108. The housing assembly 102 defines a housing accommodation cavity 142 for accommodating the inner sleeve 106 and the additional gas-liquid separation apparatus 108. The gas-liquid separator 100 further includes an annular channel 110 between the housing assembly 102 and the inner sleeve 106.

FIG. 2A to FIG. 2D are respectively a side view, a top view, an axial cross-sectional view, and an exploded view of the housing assembly 102 shown in FIG. 1A. As shown in FIG. 2A to FIG. 2D, the housing assembly 102 includes an outer housing 122, an inlet pipe 128, a lower cover 124, and a housing bushing 104. The outer housing 122 is generally a cylindrical body extending in a height direction, which has a central axis X. a lower portion of the outer housing 122 has an opening, and a flange 123 is formed on the edge of the opening for connecting with the lower cover 124. An upper portion of the outer housing 122 is gradually contracted, and a gas outlet 134 is formed at a top portion for discharging gas. A side portion of the outer housing 122 is provided with a housing inlet (not shown) for communicating with the inlet pipe 128. The outer housing 122 has an inner side wall. A first limiting portion 231 and a second limiting portion 232 are arranged on the inner side wall of the outer housing 122. The first limiting portion 231 and the second limiting portion 232 respectively protrude radially inward from the inner side wall of the outer housing 122, and are respectively configured to limit an upper portion of the additional gas-liquid separation apparatus 108 and an upper portion of the housing bushing 104. Specifically, the additional gas-liquid separation apparatus 108 and the housing bushing 104 may sequentially enter the outer housing 122 through the opening at the lower portion of the outer housing 122, and are assembled in place.

The housing bushing 104 is substantially barrel-shaped, and an outer wall of the housing bushing 104 is arranged in close contact with the inner side wall of the outer housing 122. Therefore, at least a portion of the housing accommodation cavity 142 is defined by the inner side wall 244 of the housing bushing 104. An inlet 132 is provided on the inner side wall 244. In an example, the inlet 132 has a size and a shape completely the same as those of the housing inlet, and the inlet 132 is aligned with the housing inlet to allow a fluid to pass through the inlet pipe 128 and then flow through the housing inlet and the inlet 132 into the housing accommodation cavity 142. The inlet 132 is arranged at a middle portion of the outer housing 122 in the height direction, to ensure that the lower portion of the inlet 132 has sufficient depth to accommodate separated liquid, and the upper portion of the inlet 132 has enough space to install the additional gas-liquid separation apparatus 108.

Figure 2A:
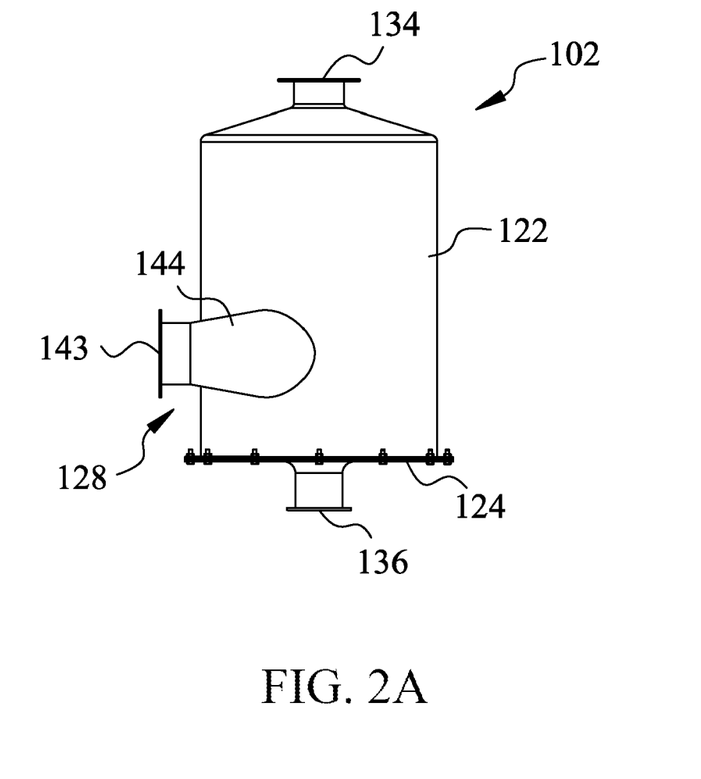
FIG. 2A is a side view of a housing assembly shown in FIG. 1A.
Figure 2B:
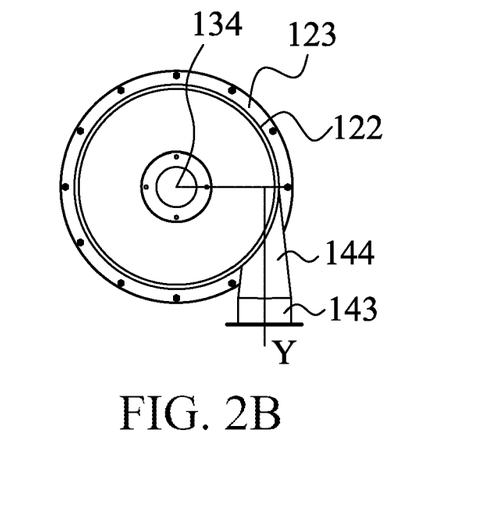
FIG. 2B is a top view of the housing assembly shown in FIG. 1A.
Figure 2C:
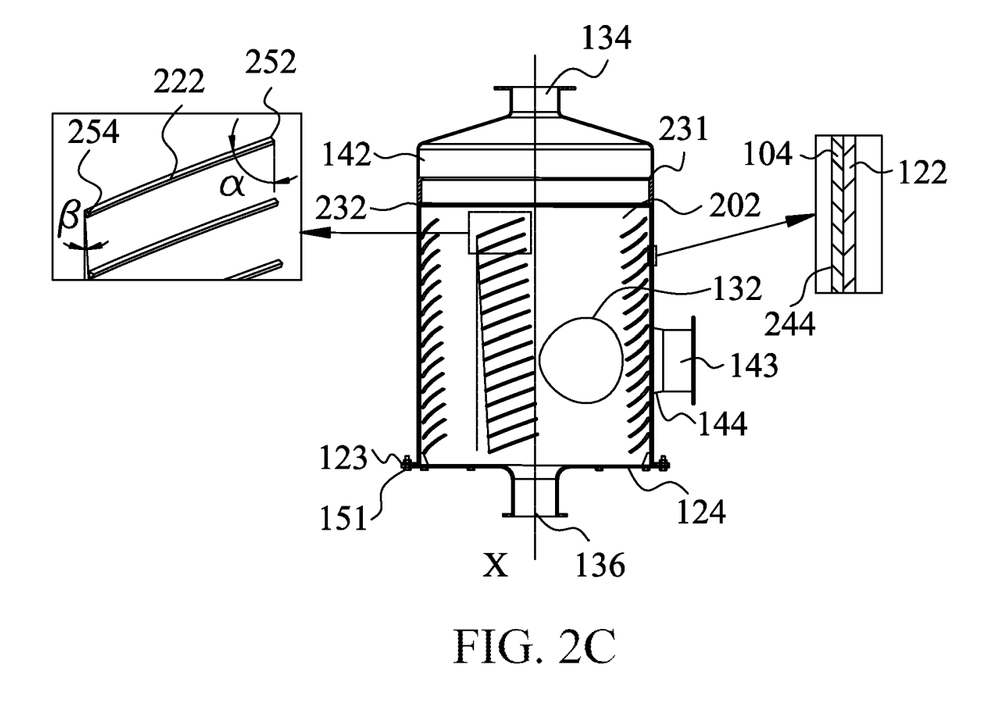
FIG. 2C is an axial cross-sectional view of the housing assembly shown in FIG. 1A.

A plurality of first ribs 222 are arranged on the inner side wall 244 of the housing bushing 104. In this embodiment of this application, each of the plurality of first ribs 222 is formed by extending substantially along a straight line. Cross-sectional shapes of the plurality of first ribs 222 may be triangles, circles, squares, and the like. Each of the plurality of first ribs 222 is arranged at an angle α with respect to the height direction (that is, the X-axis direction) of the housing bushing 104. Each first rib 222 includes a first rib windward end (or a head end) 252 and a first rib leeward end (or a tail end) 254. In a flow direction of a fluid flowing into the housing accommodation cavity 142 from the inlet 132, the first rib windward end 252 is located upstream of the first rib leeward end 254. The flow direction of the fluid flowing into the housing accommodation cavity 142 from the inlet 132 refers to a movement direction of the fluid along the annular shape after entering the annular channel 110 from the inlet 132. In this embodiment of this application, the flow direction of the fluid flowing into the housing accommodation cavity 142 from the inlet 132 is a counter-clockwise direction in the annular channel 110 as shown in FIG. 2B. In the height direction of the housing bushing 104, a height of the first rib windward end 252 is higher than a height of the first rib leeward end 254. In this way, in the process in which the fluid flows into the housing accommodation cavity 142 from the inlet 132, the fluid can impact the first ribs 222, so that the liquid in the fluid hits the first ribs 222 and then adheres to the first ribs 222, to separate the liquid from the gas. In an example, in this embodiment of this application, the angle α between each of the plurality of first ribs 222 and the height direction is greater than 0° and less than 45°. With such an arrangement, the lengths of the first ribs 222 are longer in the height direction, to improve the possibility that the fluid hits the first ribs 222, and the fluid (for example, separated gas) near the first ribs 222 can be induced to move obliquely downward, to accelerate the downward fall of the liquid collected on the first ribs 222 by using the movement of the fluid, thereby improving the separation rate of the liquid and the gas.

In addition, the plurality of first ribs 222 are further arranged into a plurality of groups of first ribs. Each group of first ribs is arranged along the height direction of the housing bushing 104, and a plurality of groups of first ribs are arranged along a circumferential direction of the inner side wall 244 and are spaced apart from each other, so that the liquid adhering to the first ribs 222 can slide down to the bottom portion of the housing accommodation cavity 142 along the inner side wall 244 (that is, at the intervals of the plurality of groups of first ribs) of the housing bushing 104. For the plurality of groups of first ribs, for adjacent first ribs, a first rib leeward end 254 of a first rib 222 at a higher height is located downstream of a first rib leeward end 254 of a first rib 222 at a lower height. When the liquid adhering to the first ribs 222 is blown to the first rib leeward end 254 and separated from the first ribs 222, such an arrangement can prevent droplets on the first ribs 222 at a higher height from dripping onto the first ribs 222 at a lower height, thereby preventing the liquid from accumulating on the first ribs 222 at the lower height. In an example, in this embodiment of this application, for each group of first ribs, a plurality of first rib leeward ends 254 form a straight line, which forms an angle β with the height direction. The value range of the angle β is greater than 0° and less than 30°.

Figure 2D:
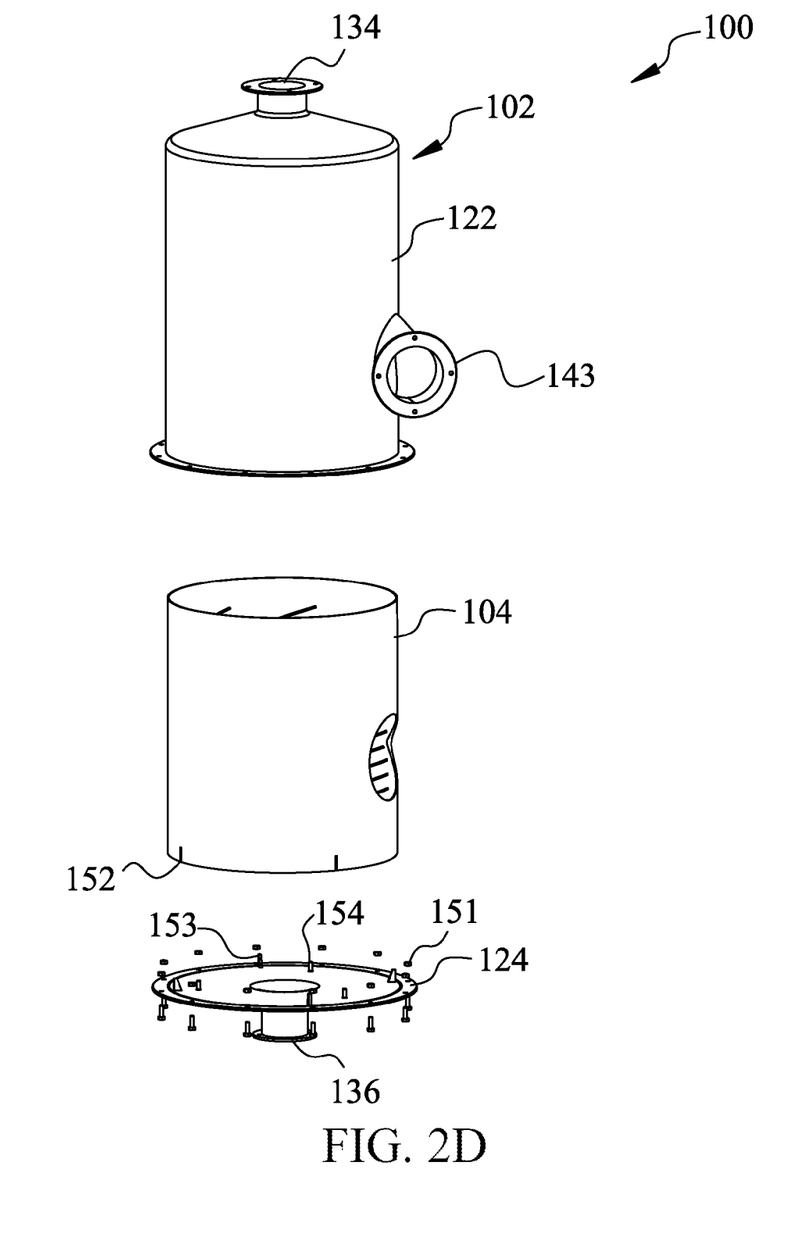
FIG. 2D is an exploded view of the housing assembly shown in FIG. 1A.

A bottom portion of the housing bushing 104 is further provided with a plurality of grooves 152 for matching protruding portions 153 on the lower cover 124, to prevent the housing bushing 104 from rotating with respect to the outer housing 122 due to the impact of the fluid entering the housing assembly 102.

The lower cover 124 is substantially disc-shaped, and a liquid outlet 136 is provided on the lower cover 124 for discharging the liquid separated from the gas. The lower cover 124 is connected to the lower portion of the outer housing 122 through a connecting member 151. In this embodiment of this application, the connecting member 151 is a nut and a screw. A person skilled in the art can understand that the connecting member 151 may be alternatively other known connecting manners. The upper portion of the lower cover 124 is provided with the plurality of protruding portions 153, and the plurality of protruding portions 153 can be snapped into the plurality of grooves 152 at the bottom portion of the housing bushing 104, to prevent the housing bushing 104 from rotating in the outer housing 122. The upper portion of the lower cover 124 is further provided with a plurality of protruding rods 154. The plurality of protruding rods 154 can cooperate with a plurality of connecting portions 312 (referring to FIG. 3) in the inner sleeve body 302 to be connected to the inner sleeve body 302.

The housing assembly 102 further includes an inlet pipe 128. The inlet pipe 128 has a central axis Y. The central axis Y is perpendicular to a radial direction of the outer housing 122, and has a vertical point close to the edge of the outer housing 122, so that the fluid entering the housing accommodation cavity 142 from the inlet pipe 128 can flow against the inner side wall 244 of the housing accommodation cavity 142 as much as possible. Specifically, the inlet pipe 128 includes a first inlet pipe section 143 and a second inlet pipe section 144, where the first inlet pipe section 143 is communicated with the housing inlet through the second inlet pipe section 144. The first inlet pipe section 143 is a circular pipe section. The second inlet pipe section 144 is an elliptical pipe section. The second inlet pipe section 144 is arranged such that a size of the elliptical pipe section in the height direction (that is, along the central axis X direction) of the outer housing 122 is larger than a size of the elliptical pipe section in the horizontal direction, so that when the fluid enters the housing accommodation cavity 142 from the inlet pipe 128, the fluid can flow and spread in the height direction. In this way, more fluid can flow against the inner side wall 244 of the housing accommodation cavity 142, improving the liquid collection efficiency.

A person skilled in the art can understand that although the first inlet pipe section 143 is a circular pipe section and the second inlet pipe section 144 is an elliptical pipe section in this application, the size of the second inlet pipe section 144 is larger than that of the first inlet pipe section 143 in the height direction of the outer housing 122. This is because when the size of the second inlet pipe section 144 is larger than that of the first inlet pipe section 143, a jet effect can be generated on the fluid in the height direction.

A person skilled in the art can also understand that although the housing assembly 102 includes the outer housing 122 and the housing bushing 104 in this embodiment, and the housing bushing 104 abuts on the inner side wall of the outer housing 122, in some other embodiments, the outer housing 122 and the housing bushing 104 may be alternatively formed integrally.

Figure 3:
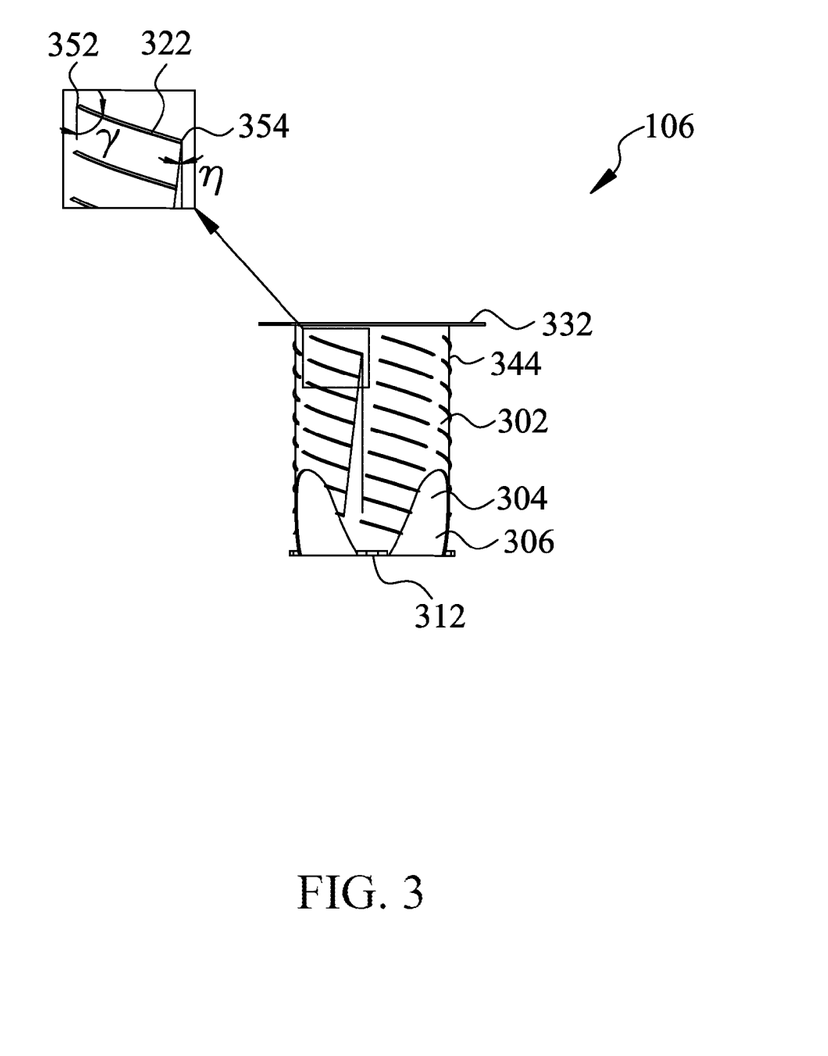
FIG. 3 is a side view of an inner sleeve shown in FIG. 1A.

FIG. 3 is a side view of the inner sleeve 106 shown in FIG. 1A. As shown in FIG. 3, the inner sleeve 106 includes an inner sleeve body 302 and an annular baffle 332. The inner sleeve body 302 is substantially cylindrical and defines an inner sleeve accommodation cavity 304. A lower portion of the inner sleeve body 302 is configured for connecting with the lower cover 124, to enable the inner sleeve accommodation cavity 304 to be communicated with the liquid outlet 136. More specifically, the lower portion of the inner sleeve body 302 is provided with the plurality of connecting portions 312, in which holes are provided to accommodate the plurality of protruding rods 154 on the lower cover 124, so that the inner sleeve body 302 is connected to the lower cover 124. An upper portion of the inner sleeve body 302 is provided with the annular baffle 332. The annular baffle 332 is formed by extending horizontally outward from an upper edge of the inner sleeve body 302. When the inner sleeve 106 is assembled in the housing assembly 102, an outer edge of the annular baffle 332 abuts the inner side wall 244 of the housing bushing 104, and the outer side wall of the inner sleeve body 302 is spaced apart from the inner side wall of the outer housing 122, so that the housing bushing 104, the inner sleeve 106, and the lower cover 124 collectively define the annular channel 110. The lower portion of the inner sleeve body 302 is further provided with a plurality of communication ports 306, to enable the annular channel 110 to be communicated with the inner sleeve accommodation cavity 304 through the communication ports 306.

As shown in FIG. 3, the inner sleeve 106 further includes a plurality of second ribs 322. The plurality of second ribs 322 are arranged on the outer side wall 344 of the inner sleeve body 302. In this embodiment of this application, each of the plurality of second ribs 322 is formed by extending substantially along a straight line. Cross-sectional shapes of the plurality of second ribs 322 may be triangles, circles, squares, and the like.

Each of the plurality of second ribs 322 is arranged at an angle γ with respect to the height direction of the housing assembly 102. Each second rib 322 includes a second rib windward end (or a head end) 352 and a second rib leeward end (or a tail end) 354. In a flow direction of a fluid flowing into the housing accommodation cavity 142 from the inlet 132, the second rib windward end 352 is located upstream of the second rib leeward end 354. In the height direction of the housing assembly 102, a height of the second rib windward end 352 is higher than a height of the second rib leeward end 354. In this way, in the process in which the fluid flows into the annular channel 110 from the inlet 132, the fluid can impact the second ribs 322, so that the liquid in the fluid hits the second ribs 322 and then adheres to the second ribs 322, to separate the liquid from the gas. In an example, in this embodiment of this application, the angle γ between each of the plurality of second ribs 322 and the height direction is greater than 0° and less than 45°. With such an arrangement, the lengths of the second ribs 322 are longer in the height direction, to improve the possibility that the fluid hits the second ribs 322, and the fluid (for example, separated gas) near the second ribs 322 can be induced to move obliquely downward, to accelerate the downward fall of the liquid collected on the second ribs 322 by using the movement of the fluid, thereby improving the separation rate of the liquid and the gas.

In addition, the plurality of second ribs 322 are further arranged into a plurality of groups of second ribs. Each group of second ribs is arranged along the height direction of the housing assembly 102, and a plurality of groups of second ribs are arranged along a circumferential direction of the inner sleeve body 302 and are spaced apart from each other, so that the liquid adhering to the second ribs can slide down to the bottom portion of the annular channel 110 along the outer side wall 344 (that is, at the intervals of the plurality of groups of second ribs) of the inner sleeve body 302. For the plurality of groups of second ribs, for adjacent second ribs, a second rib leeward end 354 of a second rib 322 at a higher height is located downstream of a second rib windward end 352 of a second rib 322 at a lower height. When the liquid adhering to the second ribs 322 is blown to the second rib leeward end 354 and separated from the second ribs 322, such an arrangement can prevent droplets on the second ribs 322 at a higher height from dripping onto the second ribs 322 at a lower height, thereby preventing the liquid from accumulating on the second ribs 322 at the lower height. In an example, in this embodiment of this application, for each group of second ribs, a plurality of second rib leeward ends 354 form a straight line, which forms an angle η with the height direction. The value range of the angle η is greater than 0° and less than 30°.

Figure 4A:
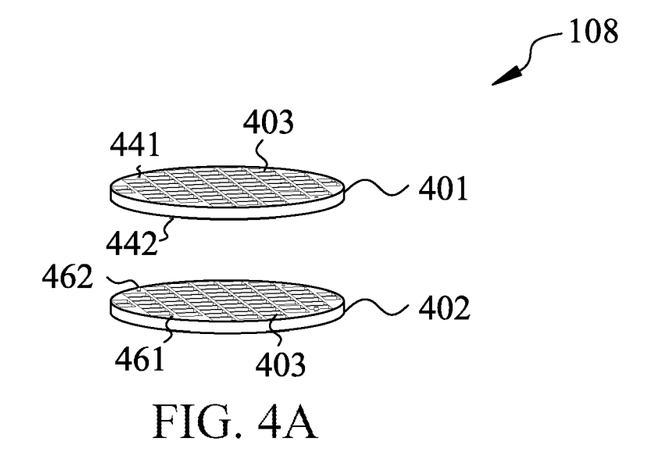
FIG. 4A is an exploded view of an additional gas-liquid separation apparatus shown in FIG. 1B.
Figure 4B:
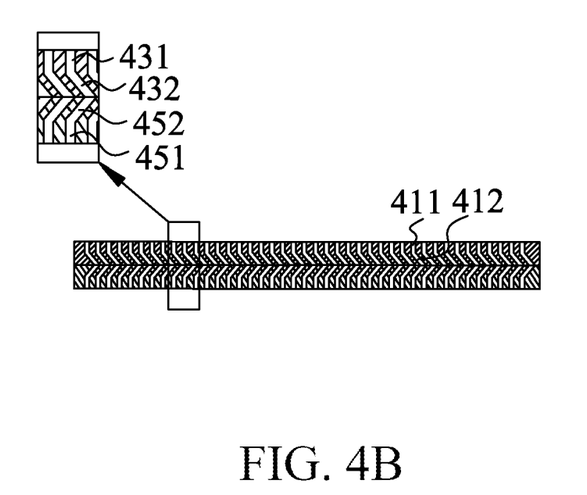
FIG. 4B is an enlarged cross-sectional view of the additional gas-liquid separation apparatus shown in FIG. 1B.

FIG. 4A and FIG. 4B are respectively an exploded view and an enlarged cross-sectional view of the additional gas-liquid separation apparatus 108. Specifically, the additional gas-liquid separation apparatus 108 includes a first plate 401 and a second plate 402. In this embodiment of this application, the first plate 401 and the second plate 402 have the same structure. Therefore, the specific structure of the first plate 401 is described as an example below:

As shown in FIG. 4A and FIG. 4B, the first plate 401 is substantially a circular disk that can be matched with the inner side wall of the outer housing 122, and includes a plurality of bent channels running vertically through the first plate 401. Each of the plurality of bent channels includes a first vertical channel 431 and a first inclined channel 432. The first vertical channels 431 are substantially vertically distributed with respect to the horizontal direction, so that the fluid can more easily enter the additional gas-liquid separation apparatus 108. The first inclined channels 432 are distributed at 45° with respect to the horizontal direction, so that the flow direction of the fluid entering the bent channels is changed. The first plate 401 further includes a pair of mounting holes 441 and a pair of protruding portions 442. The pair of mounting holes 441 are vertically arranged through the first plate 401 and are arranged at two opposite edges on the same diameter of the first plate 401. The pair of protruding portions 442 are formed by extending downward from the lower surface of the first plate 401 and are also arranged at two opposite edges on the same diameter of the first plate 401. The straight line connecting the pair of mounting holes 441 is substantially perpendicular to the straight line connecting the pair of protruding portions 442, thereby enhancing the stability. Similarly, the second plate 402 includes a plurality of bent channels. Each of the plurality of bent channels includes a second vertical channel 451 and a second inclined channel 452. The second plate 402 further includes a pair of mounting holes 461 and a pair of protruding portions 462.

The first plate 401 and the second plate 402 can form the additional gas-liquid separation apparatus 108 by simple assembly. Specifically, the first plate 401 and the second plate 402 are stacked, the pair of protruding portions 442 in the first plate 401 are inserted into the pair of mounting holes 461 in the second plate 402, and the pair of protruding portions 462 in the second plate 402 are inserted into the pair of mounting holes 441 in the first plate 401. When the first plate 401 and the second plate 402 are stacked and assembled in place, the bent channels in the first plate 401 and the bent channels in the second plate 402 are communicated with each other. More specifically, the first inclined channels 432 in the first plate 401 are communicated with the second inclined channels 452 in the second plate 402 to form the bent channels. In an example, the value range of the angle formed by the first inclined channel 432 and the second inclined channel 452 is greater than or equal to 45° and less than or equal to 90°. In this embodiment of this application, the thickness of the first plate 401 and the second plate 402 is about 10 to 30 mm, and the width of the bent channels in the first plate 401 and the bent channels in the second plate 402 is about 4 to 10 mm.

The conventional additional gas-liquid separation apparatus includes a base plate and a plurality of partition plates. The plurality of partition plates are spaced apart from each other and fixed on the base plate by connecting members, to form a plurality of bent channels for receiving the mixed fluid. However, the mounting process of such a conventional additional gas-liquid separation apparatus is very complex, and each of the plurality of partition plates needs to be fixed to the base plate by a connecting member, which increases the processing time and the costs of components.

However, the additional gas-liquid separation apparatus 108 in this application has the advantages of easy production and simple assembly. Specifically, the first plate 401 and the second plate 402 in the additional gas-liquid separation apparatus 108 in this application have the same structure, and both include inclined channels and vertical channels. The vertical channels facilitate the entry and exit of the mixed fluid into and out of the additional gas-liquid separation apparatus 108, and the inclined channels and the vertical channels are bent to change the movement direction of the mixed fluid. The configuration of the inclined channels and the vertical channels allows the additional gas-liquid separation apparatus 108 of this application to be made of plastic and produced by molding. The molding production manner can greatly improve the manufacturing efficiency. In addition, after being molded, the first plate 401 and the second plate 402 can be mounted through the pair of mounting holes 461 and the pair of protruding portions provided thereon without requiring additional connecting members or processing tools. In addition, other materials with good hydrophobicity (for example, Teflon) can be further coated on the additional gas-liquid separation apparatus 108 made of plastic, thereby increasing the gas-liquid separation rate of the additional gas-liquid separation apparatus 108.

Referring to FIG. 1B, the additional gas-liquid separation apparatus 108 is mounted in the outer housing 122. The upper portion of the additional gas-liquid separation apparatus 108 abuts the first limiting portion 231 (referring to FIG. 2C), and the lower portion of the additional gas-liquid separation apparatus 108 abuts the housing bushing 104, so that the additional gas-liquid separation apparatus is assembled in the outer housing 122. Therefore, the housing accommodation cavity 142 is divided into an upper accommodation cavity and a lower accommodation cavity by the additional gas-liquid separation apparatus 108. Both the housing bushing 104 and the inner sleeve 106 are arranged in the lower accommodation cavity. The fluid in the lower accommodation cavity needs to pass through the bent channels in the additional gas-liquid separation apparatus 108 to enter the upper accommodation cavity.

A flow path of the gas and liquid mixed fluid (referred to as "mixed fluid" below) after entering the gas-liquid separator 100 from the inlet pipe 128 is described below with reference to FIG. 1B. Specifically, the mixed fluid flows into the housing inlet from the first inlet pipe section 143 and the second inlet pipe section 144. When the mixed fluid flows in the second inlet pipe section 144, since the size of the second inlet pipe section 144 in the height direction increases, the mixed fluid generates a jet in the height direction. When the mixed fluid enters the annular channel 110 through the housing inlet, a contact area of the mixed fluid where the jet occurs and the inner side wall 244 of the housing bushing 104 increases, thereby increasing the probability of hitting the inner side wall 244 and the plurality of first ribs 222 arranged on the inner side wall 244 by the mixed fluid. The liquid in the mixed fluid entering the annular channel 110 hits the inner side wall 244 of the housing bushing 104 and the first ribs 222 arranged on the inner side wall 244 due to a greater centrifugal force thereof than the gas. A liquid film is formed on the inner side wall 244 of the housing bushing 104 and the plurality of first ribs 222 and falls due to gravity. In addition, the flow direction of the mixed fluid in the annular channel 110 continuously changes along the annular channel 110, and the mixed fluid hits the outer side wall 344 of the inner sleeve 106 and the plurality of second ribs 322 arranged on the outer side wall 344. Therefore, a portion of the liquid in the mixed fluid also forms a liquid film on the outer side wall 344, which falls due to gravity. The liquid separated from the mixed fluid is deposited at the bottom portion of the annular channel 110 and is deposited at the bottom portion of the gas-liquid separator 100 through the plurality of communication ports 306. In an example, a valve may be arranged on the liquid outlet 136, so that the liquid outlet 136 is disconnected from the external pipeline, and the liquid separated from the mixed fluid is deposited at the bottom portion. The liquid deposited at the bottom portion can create a liquid seal, so that the gas cannot flow out of the gas-liquid separator 100 directly through the liquid outlet 136.

Since the top of the annular channel 110 is blocked by the annular baffle 332, the remaining mixed fluid in the annular channel 110 cannot leave the annular channel 110 from above, but can only flow into the inner sleeve accommodation cavity 304 through the plurality of communication ports 306 and then flow upward. When the mixed fluid carrying the smaller volume of liquid flows from the lower accommodation cavity to the upper accommodation cavity, the mixed fluid needs to pass through the bent channels in the first plate 401 and the second plate 402. More specifically, the mixed fluid passes through the second vertical channels 451 and the second inclined channels 452 in the second plate 402 and the first inclined channels 432 and the first vertical channels 431 in the first plate 401 in sequence. In the bent channels, the mixed fluid needs to change the flow direction for three times to pass through the bent channels. Because the size of the bent channels is small and there are a plurality of bends in the bent channels, the liquid is impacted in the bent channels under the action of the inertial force, and flows to the bottom portion of the gas-liquid separator 100 under the action of gravity. The gas can flow upward through the bent channels, enter the upper accommodation cavity after passing through the additional gas-liquid separation apparatus 108, and then flow out of the gas-liquid separator 100 through the gas outlet 134.

It can be seen with reference to FIG. 1B that the mixed fluid entering the gas-liquid separator 100 from the inlet pipe 128 moves in the lower accommodation cavity. In the lower accommodation cavity, the mixed fluid needs to undergo changes in the flow direction at least twice. One of the changes is the change in the flow direction when the mixed fluid hits the annular channel 110, and the other is the change in the flow direction when the mixed fluid flows into the inner sleeve accommodation cavity 304 from the annular channel 110 through the plurality of communication ports 306 (the flow direction is changed from flowing downward to flowing upward). The changes in the flow direction enable most of the liquid with larger volume to separate from the mixed fluid. In an example, in the lower accommodation cavity, liquid with a particle size greater than 100 um in the mixed fluid can be collected. The mixed fluid then passes through the additional gas-liquid separation apparatus 108, and is separated again in the additional gas-liquid separation apparatus 108. In an example, the additional gas-liquid separation apparatus 108 can separate droplets with a particle size larger than 10 um. So far, the gas-liquid separator 100 of this application can separate liquid with a large particle size and a small particle size from the fluid, thereby achieving a higher separation rate.

It should be noted that, in this embodiment of this application, although the inner sleeve 106 includes the annular baffle 332 to seal the upper end of the annular channel 110 to force the mixed fluid to flow into the inner sleeve accommodation cavity 304 through the plurality of communication ports 306 below, in another example, the inner sleeve 106 may alternatively not include the annular baffle 332. In other words, after entering the annular channel 110, the mixed gas can flow toward the additional gas-liquid separation apparatus 108 from the upper end of the annular channel 110.

The gas-liquid separator 100 of this application mainly realizes the gas-liquid separation of the mixed fluid by using the annular channel 110 and the additional gas-liquid separation apparatus 108. The first ribs and the second ribs are respectively arranged on the inner side wall and the outer side wall of the annular channel 110, thereby increasing the separation efficiency of the liquid. The gas-liquid separator 100 according to this application has a compact structure, a small overall volume, and high separation efficiency.

Although only some of the features of this application are illustrated and described herein, a person skilled in the art can still make various modifications and changes. Therefore, it should be understood that the appended claims are intended to cover all such modifications and changes as fall within the essential spirit of this application.

What is claimed is:

1. A gas-liquid separator, comprising:
    a housing assembly, wherein the housing assembly has an inner side wall-defining a housing accommodation cavity, the housing assembly comprises an inlet, a gas outlet, and a liquid outlet, the inlet, the gas outlet, and the liquid outlet are communicated with the housing accommodation cavity, the inlet is provided on the inner side wall of the housing accommodation cavity, the gas outlet is provided above the inlet, and the liquid outlet is provided below the inlet;
    a plurality of first ribs arranged along the inner side wall of the housing assembly, wherein:
        each first rib of the plurality of first ribs is arranged at an angle with respect to a height direction of the housing assembly, and each first rib of the plurality of first ribs comprises a first rib windward end and a first rib leeward end;
        in a flow direction of a fluid entering the housing accommodation cavity from the inlet, the first rib windward end is located upstream of the first rib leeward end, and
        in the height direction of the housing assembly, the first rib windward end is higher than the first rib leeward end; and
    an inner sleeve arranged in the housing accommodation cavity, wherein an outer side wall of the inner sleeve and the inner side wall of the housing assembly cooperatively define an annular channel within the housing accommodation cavity.

2. The gas-liquid separator of claim 1, wherein the housing assembly comprises an outer housing and a housing bushing, the housing bushing is arranged in the outer housing, and the inner side wall defining the housing accommodation cavity is formed by the housing bushing.

3. The gas-liquid separator of claim 1, wherein the angle between each of the plurality of first ribs and the height direction is greater than 0 degrees and less than or equal to 45 degrees.

4. The gas-liquid separator of claim 1, wherein:
    the plurality of first ribs is arranged into a plurality of groups of first ribs, and
    each group of first ribs is arranged along the height direction of the housing assembly, and the plurality of groups of first ribs is arranged along a circumferential direction of the housing assembly and spaced apart from each other.

5. The gas-liquid separator of claim 4, wherein in the flow direction of the fluid entering the housing accommodation cavity from the inlet, for adjacent first ribs of the plurality of first ribs, the first rib leeward end of a first rib of the plurality of first ribs at a higher height is located downstream of the first rib leeward end of an additional first rib of the plurality of first ribs at a lower height.

6. The gas-liquid separator of claim 1, wherein the inlet is communicated with the annular channel and the inner sleeve comprises:
    the outer side wall; and
    a plurality of second ribs arranged along the outer side wall of the inner sleeve, wherein:
        each second rib of the plurality of second ribs is arranged at an additional angle with respect to the height direction of the housing assembly, and each second rib of the plurality of second ribs comprises a second rib windward end and a second rib leeward end,
        in the flow direction of the fluid entering the housing accommodation cavity from the inlet, the second rib windward end is located upstream of the second rib leeward end, and
        in the height direction of the housing assembly, the second rib windward end is higher than the second rib leeward end.

7. The gas-liquid separator of claim 1, wherein the inner sleeve comprises an inner sleeve body, the inner sleeve body defines an inner sleeve accommodation cavity, the inner sleeve accommodation cavity is communicated with the liquid outlet, and a communication port is provided at a lower portion of the inner sleeve body, wherein the annular channel is communicated with the inner sleeve accommodation cavity via the communication port.

8. The gas-liquid separator of claim 1, wherein the inner sleeve comprises an annular baffle positioned above the annular channel, wherein the annular baffle at least partially defines the annular channel.

9. The gas-liquid separator of claim 1, comprising:
    a first inlet pipe section and a second inlet pipe section, wherein the first inlet pipe section is connected to the second inlet pipe section, and the first inlet pipe section is communicated with the inlet through the second inlet pipe section
    wherein, in the height direction of the housing assembly, a size of the second inlet pipe section is larger than a size of the first inlet pipe section.

10. The gas-liquid separator of claim 1, comprising:
    an additional gas-liquid separation apparatus, wherein the additional gas-liquid separation apparatus is transversely arranged in the housing accommodation cavity and divides the housing accommodation cavity into an upper accommodation cavity and a lower accommodation cavity; and
    a plurality of bent channels provided in the additional gas-liquid separation apparatus, wherein the upper accommodation cavity is communicated with the lower accommodation cavity via the plurality of bent channels,
    wherein the additional gas-liquid separation apparatus comprises a first plate and a second plate that are stacked relative to one another, the first plate and the second plate are molded, and each bent channel of the plurality of bent channels runs through the first plate and the second plate.

11. The gas-liquid separator of claim 10, wherein
each bent channel of the plurality of bent channels comprises a first vertical channel and a first inclined channel formed in the first plate and a second vertical channel and a second inclined channel formed in the second plate, and
the first inclined channel is communicated with the second inclined channel.

12. A gas-liquid separator, comprising:
a housing assembly, wherein an inner side wall of the housing assembly defines a housing accommodation cavity, the housing assembly comprises an inlet, a gas outlet, and a liquid outlet, the inlet, the gas outlet, and the liquid outlet are communicated with the housing accommodation cavity, the gas outlet is provided above the inlet, and the liquid outlet is provided below the inlet;
a plurality of first ribs arranged along the inner side wall of the housing assembly and along a height direction of the housing assembly, wherein:
each first rib of the plurality of first ribs is arranged at an angle with respect to the height direction of the housing assembly, and each first rib of the plurality of first ribs comprises a first rib windward end and a first rib leeward end,
in a flow direction of a fluid entering the housing accommodation cavity from the inlet, the first rib windward end is located upstream of the first rib leeward end, and
in the height direction of the housing assembly, the first rib windward end is higher than the first rib leeward end; and
an inner sleeve positioned within the housing accommodation cavity and comprising:
an outer side wall spaced a distance from the inner side wall of the housing assembly; and
a plurality of second ribs arranged along the outer side wall of the inner sleeve and along the height direction of the housing assembly.

13. The gas-liquid separator of claim 12
wherein the outer side wall of the inner sleeve and the inner side wall of the housing assembly cooperatively define an annular channel within the housing accommodation cavity, and the inlet is communicated with the annular channel.

14. The gas-liquid separator of claim 13, wherein the plurality of first ribs is positioned within the annular channel.

15. The gas-liquid separator of claim 13, wherein the plurality of second ribs is positioned within the annular channel.

* * * * *